Feb. 8, 1938.    C. E. SWENSON    2,107,721

UNIVERSAL DRIVE MECHANISM

Filed April 9, 1936

Inventor:
Carl E. Swenson
By
Wilson, Dowell, McCanna & Wintercorn
Attys

Patented Feb. 8, 1938

2,107,721

UNITED STATES PATENT OFFICE 2,107,721

UNIVERSAL DRIVE MECHANISM

Carl E. Swenson, Rockford, Ill., assignor to Borg-Warner Corporation, Chicago, Ill., a corporation of Illinois Application April 9, 1936, Serial No. 73,444

2 Claims. (Cl. 64—23)

This invention relates to universal joints, and more particularly to improved means for connecting the yoke or terminal member of a universal joint to a transmission shaft.

An important object of the invention is to provide a generally improved universal joint and drive shaft construction wherein the vibration due to misalignment is materially reduced.

Another object is the provision of universal joint and drive shaft construction having a slip joint wherein the center of mass of the drive shaft connection member is closer to the center of the joint than has heretofore been possible.

I have also aimed to provide a construction of the class described having improved balance and improved lubrication characteristics.

A further object of the invention is to provide a construction in which the unbalanced mass is materially reduced.

Other objects and advantages will become apparent from the following description and the accompanying drawing, in which—

Figure 1:
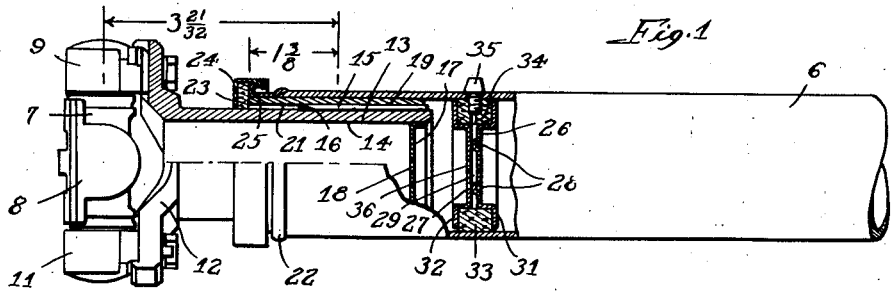
Figure 1 is a fragmentary view partly in section showing my invention.

Referring to the drawing, the numeral 6 designates a drive tube of conventional design as used in automotive construction. The numeral 7 indicates the spider or intermediate transmission member of a universal joint of the automotive type. The numeral 8 designates a bearing for the spider adapted to be attached to a yoke or terminal coupling member not shown, while the numerals 9 and 11 designate bearing members within which the spider 7 is seated, the bearing members being carried on a yoke or terminal coupling member 12 in accordance with the usual practice.

According to my invention, the yoke 12 extends outwardly as shown at 13, in this instance and preferably, this outwardly extending portion of the yoke is tubular having a central bore 14. Toward the outer end of the portion 13, the outer surface thereof is provided with splines 15 which terminate at a point intermediate the ends of the portion 13 as shown at 16. The outer end of the bore 14 is closed by a metal insert 17 having a small opening 18 positioned on the axis of rotation of the yoke.

A cylindrical sleeve 19 surrounds the yoke portion 13 and is provided with splines 21 on its inner surface complemental to the splines 15 on the portion 13. The sleeve 19 is of sufficient length to extend a substantial distance along the length of the yoke portion 13, and is preferably as long as other factors will permit so as to obtain maximum bearing surface as between the sleeve and the portion 13 and the sleeve and the tube 6, as will presently appear. The sleeve 19 is of such outer dimensions as to be closely received in the end of the tube 6 as shown in Figure 1, and to extend therein through a major portion of its length, the tube being attached to the sleeve 19 by means of a weld indicated generally at 22, the attachment being such that the longitudinal axis of the sleeve will as nearly as possible coincide with the longitudinal axis of the tube 6. A seal 23 of cork, felt or similar material is held in position by an annular retainer 24 attached to a flange 25 carried on the exposed end of the sleeve 19. This seal wipes against the inner cylindrical part of the portion 13 to prevent the loss of lubricant.

A dam is positioned in the tube 6 adjacent the outer end of the yoke portion 13, and comprises a pair of plates 26 and 27 suitably fastened together, the plate 26 having projections 28 for spacing the plates apart to provide a thin space 29 between the central portion of the plates. The plates are outwardly flared along their annulus as shown at 31 and 32 to provide an annular recess for the reception of a ring-like seal 33 of cork or other similar material having similar resiliency and capable of sealing the junction between the dam and the inner surface of the tube. The seal 33 has a channel 34 adapted for the reception of a fitting 35 which passes through the wall of the tube to supply lubricant to the space 29. The plate 27 has a small opening 36 located substantially upon the axis of rotation for the passage of lubricant into the space between the plate 27 and the insert 17. Thus lubricant is supplied to the cooperating splines 15 and 21 through the fitting 35, the lubricant passing through the opening 34, the space 29 and the opening 36. The opening 18 of the insert 17 prevents an excess of lubricant from being charged into the space forward of the plate 27 to an extent such that sufficient pressure is developed to move the dam in the tube 6, the excess of lubricant passing through the opening 18. Any lubricant remaining in the space 29 between the plates is thrown out through the fitting 35 when the tube is put into rotation, the space 29 being made very small so as to reduce the amount of this lubricant to a minimum. The lubricant is then trapped in the space between the plate 27, the insert 17 and the dam 23 together with the parts bordering the space, since the openings 36 and 18 lie substantially on the center of rotation.

Figure 2:
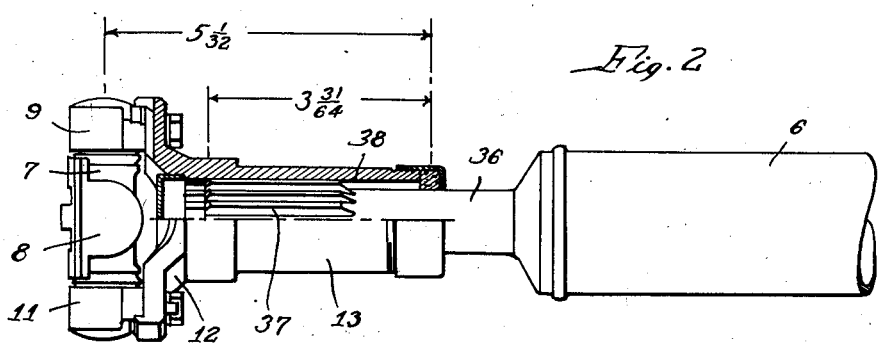
Fig. 2 is a view similar to Figure 1 showing a universal joint and transmission shaft of the same size and design as that shown in Figure 1, wherein the slip joint is made according to the teachings of the art.
Figure 3:
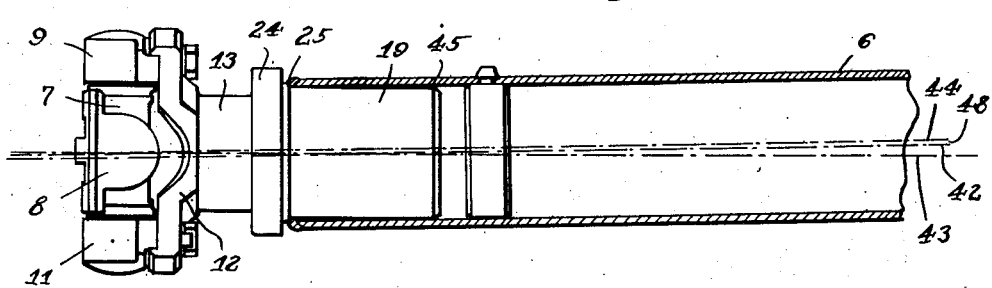
Fig. 3 is a view similar to Figure 1 with the drive tube shown in section.
Figure 4:
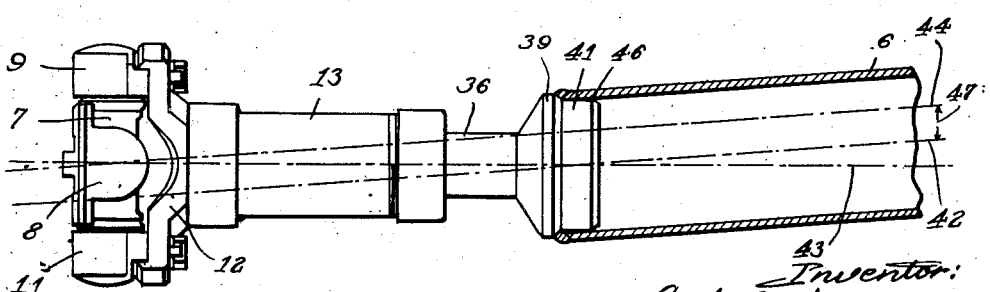
Fig. 4 is a view similar to Fig. 2 showing only the drive tube in section.

The manifold advantages of my improved construction will be apparent from a comparison of Figs. 1 and 3 with Figs. 2 and 4, respectively. The problem with which this invention is largely concerned involves the difficulty of connecting the universal joint with the transmission shaft in such manner that the axis of rotation of the two will coincide. In actual practice it is impossible to make the two coincide. However, the greater the divergence of these two axes the greater will be the amount of vibration due to this unbalanced condition. However, I have found that this difficulty may be largely overcome by remedying certain difficulties heretofore inherent in this type of construction. One of the causes for the difficulty is illustrated in Fig. 4 in which the condition is somewhat exaggerated. In this construction a stub shaft indicated generally by the numeral 36 carries splines 37 on its forward end cooperating with splines 38 on the inner surface of the yoke portion 13, the tube end of the shaft stub having a flange 39 and a portion 41 adapted to be received in the end of the tube 6. It will be seen that the portion 41 is of relatively short length, and this length must be maintained relatively short in order to keep down the weight of the construction as well as the distance between the end of the tube and the joint. It will be observed that because of this relatively short length it becomes difficult as a matter of practice to weld the shaft stub 36 into the end of the tube so that they are in absolute alignment. In Fig. 4 I have shown a misalignment wherein the line 42 represents the axis of rotation of the tube 6, whereas the line 43 represents the axis of rotation of the shaft stub 36. The line 44 represents the axis of rotation of the composite shaft and joint. From this it will be seen that as the tube and joint turn they have not only a movement of rotation, but also a movement of revolution about the axis 44. From an examination of Fig. 3 it will be seen that with the same error, that is, the same gap between the end of the sleeve 19 and the wall of the tube 6 at 45, as exists between the end of the portion 41 and the inner wall of the tube 6 at 46, the difference in angularity between the lines 42, 43, and 44 becomes markedly less. In Fig. 4 the run-out, due to misalignment, is represented by the distance 47, whereas in Fig. 3 the run-out is indicated by the numeral 48. The two figures thus show in a striking manner the results accomplished by the applicant's invention.

Because of the greater length of the sleeve 19, the sleeve may be welded into the end of the tube with greater accuracy, thereby bringing the axis of rotation of the sleeve 19 and of the tube 6 nearer to coincidence. Furthermore, by placing the splines on the outside of the yoke portion 13 and on the inside of the sleeve 19, the distance between the end of the tube 6 and the center of the joint is materially reduced, thereby reducing the amount of runout even though the misalignment between these parts is the same.

Another reason for the improved balance resulting from my construction lies in the fact that the weight or mass of the combination is materially reduced, and this mass is distributed closer to the joint and at a lesser angularity. It will be seen that the shaft stub 36 is entirely eliminated and is replaced by the sleeve 19. The result of this change is apparent from a comparison of Figs. 1 and 2. These figures represent universal joint and transmission shaft assembles of identical sizes, and it will be seen that the distance from the center of the joint to the center of the mass of the shaft sleeve in Figure 1 is $3\frac{21}{32}''$, whereas the distance between the center of the joint and the center of mass of the construction shown in Fig. 2 is $5\frac{1}{32}''$. It will be seen that I am enabled to reduce this distance below any possible reduction employing the construction shown in Fig. 2 because of my improved construction. The result of this reduction in the mass and the reduction in the distance from the joint to the center of mass of the tube connection may be illustrated numerically as follows: The minimum weight of the stub shaft 36 in a construction made in accordance with Fig. 2 has been found to be about 2.1 points and the center of this mass is $5\frac{1}{32}''$ from the center of the joint, which when multiplied together, give a factor of 10.56, whereas the weight of the sleeve 19 of Fig. 2 is .67 point, which multiplied by the distance $3\frac{21}{32}''$ gives a factor of 2.45. Thus the figures 2.45 and 10.56 indicate the ratio of unbalance which tends to cause bending of the tube upon rotation thereof as a result of equal amounts of misalignment.

The significance of these figures is still more apparent when it is realized that the construction must be such as to permit longitudinal movement between the tube 6 and the yoke 12 so that centrifugal force may bend or spring the parts so as to increase the amount of misalignment at high motor speeds.

It will thus be apparent that I have provided a construction whereby more accurate alignment is obtained, and also whereby the effect of a predetermined degree of misalignment is materially reduced.

While I have thus described and illustrated a specific embodiment of my invention, I am aware that numerous alterations and changes may be made within the spirit of the invention and I do not wish to be limited except as required by the prior art.

I claim:

1. A universal drive mechanism, of the type described, comprising, a universal joint assembly having a terminal coupling member, said member having a relatively thin walled tubular portion of relatively low mass formed with splines on the outer portion of its exterior side wall and with a smooth cylindrical surface on the inward portion thereof, a sleeve telescopically disposed over said splined tubular portion of said terminal member and a portion of the said smooth outer surface thereof, said sleeve being relatively thin walled and formed on the outer portion of its inner side wall with splines engageable with said first named splines, said sleeve having a smooth outer wall of uniform diameter, a torque tube having one end fashioned with an interior wall conforming in contour and size to said smooth outer wall of said sleeve and telescopically disposed over said sleeve and providing a tight fit therewith throughout the entire length of said sleeve, means fixing the end of said torque tube to said sleeve, and a packing ring carried by the inner end of said sleeve and engaging the said smooth outer surface portion of the tubular portion of said terminal member.

2. A universal drive mechanism, of the type described, comprising, a universal joint assembly having a terminal coupling member, said member having a relatively thin walled tubular portion of relatively low mass formed with splines on the outer portion of its exterior side wall and with a smooth cylindrical surface on the inward portion thereof, a sleeve telescopically disposed over said splined tubular portion of said terminal member and a portion of the said smooth outer surface thereof, said sleeve being relatively thin walled and formed on the outer portion of its inner side wall with splines engageable with said first named splines, said sleeve having a smooth outer wall of uniform diameter, a torque tube having a relatively thin side wall and of substantially uniform diameter throughout its length, one end of said tube being fashioned with an interior wall conforming in contour and size to said smooth outer wall of said sleeve and telescopically disposed over said sleeve to provide a tight fit therewith and to leave a portion of said sleeve at its inner end exposed, a ring fitted over said sleeve and abutting the said end of said torque tube, common means fixing said end of said torque tube and said ring to said sleeve, a packing ring mounted on said ring and engaging the said smooth outer surface portion of the tubular portion of said terminal member, a plug member disposed at the outer end of said terminal member to enclose the inner portion thereof, said plug having an aperture in the center thereof disposed about the axis of rotation of the terminal member, and means carried by said torque tube for admitting lubricant between the opposed and splined portions of said sleeve and said terminal member.

CARL E. SWENSON.